3,088,951
16-METHYL DERIVATIVES OF PROGESTERONE
Arthur E. Oberster, Garwood, and Lewis H. Sarett, Princeton, N.J., assignors to Merck & Co., Inc., Rahway, N.J., a corporation of New Jersey
No Drawing. Filed Jan. 12, 1959, Ser. No. 786,024
1 Claim. (Cl. 260—397.3)

This invention relates to 16-alkyl steroids. More particularly, it is concerned with 16α-methyl derivatives of progesterone and methods of preparing these compounds.

In accordance with the present invention, it is now found that certain derivatives of 16α-methylprogesterone possess valuable pharmacological properties as progestational and anti-inflammatory agents.

It is an object of the present invention to provide 9α-fluoro-11β-hydroxy-16-methylprogesterone and methods of preparing this compound. Another object is to provide 9α-fluoro-11-keto-16α-methylprogesterone and a process for the preparation of this product. A further object is to provide 11-keto-16α-methylprogesterone and a method for the preparation of this compound. An additional object of this invention is to provide intermediate products useful in the preparation of these new compounds. Other objects will be apparent from the detailed description of this invention hereinafter provided.

Pursuant to one embodiment of the present invention, it is now found that 11α-hydroxy-16α-methylprogesterone can be converted to 9α-fluoro-11β-hydroxy-16α-methylprogesterone and 9α-fluoro-11-keto-16α-methylprogesterone by procedures which may be shown as follows:

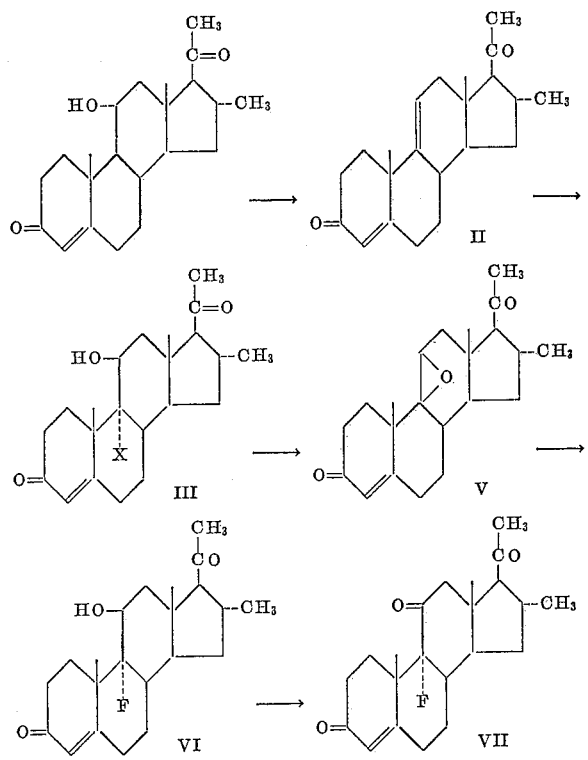

wherein X represents a halogen from the group consisting of chlorine and bromine In the foregoing process the starting compound 11α-hydroxy-16α-methylprogesterone is first reacted with a dehydrating agent to obtain the corresponding diene, $\Delta^{9(11)}$-16α-methylprogesterone (II). The reaction of this compound with hypochlorous or hypobromous acid produces the corresponding 9α-halo compound, namely, 9α-halo-11β-hydroxy-16α-methylprogesterone (III). When this 9α-halo compound is reacted with an alkali, the 9,11-oxido compound (V) is obtained. Reaction of the latter compound with hydrogen fluoride yields 9α-fluoro-11β-hydroxy-16α-methylprogesterone (VI). Oxidation of this compound with a suitable oxidizing agent affords 9α-fluoro-11-keto-16α-methylprogesterone (VII).

In the first step of the above-described process, the starting compound is reacted with a suitable dehydrating agent to form the corresponding $\Delta^{9(11)}$-compound. Suitable dehydrating agents for this reaction that might be mentioned are methyl chlorosulfinate, methanesulfonyl chloride and the like. Alternatively, the dehydration is effected by intimately contacting the starting material with N-bromoacetamide and treating the resulting reaction product with sulfur dioxide. In carrying out the dehydration in accordance with another embodiment of this invention, the 11α-hydroxy-16α-methylprogesterone is intimately contacted with methane sulphonyl chloride in the presence of pyridine at low temperatures to produce the corresponding 11α-mesylate. The intermediate product thus obtained is converted to the diene compound by heating with acetic acid for sufficient time to effect the dehydration and produce $\Delta^{9(11)}$-16α-methylprogesterone.

The next step of the process is effected by reacting the $\Delta^{9(11)}$-16α-methylprogesterone with a hypohalous acid, wherein the halogen has an atomic weight between 35–80, namely, bromine or chlorine. This reaction is most conveniently effected by reacting a suspension or solution of the diene compound in a suitable water-miscible solvent such as acetone with an aqueous solution of the hypohalous acid. The hypohalous acid solution is conveniently prepared in situ by reacting the appropriate N-halosuccinimide with perchloric acid. For example, the reaction is very conveniently carried out by adding aqueous perchloric acid to a mixture consisting of a suspension or solution of the diene compound in acetone and N-bromosuccinimide.

In the following step of our process the halohydrin (III) is reacted with alkaline reagents to form the 9,11-oxido compound. This reaction is readily effected by dissolving the halohydrin in a suitable solvent such as tetrahydrofuran and adding thereto a solution of potassium carbonate in water. After completion of the reaction, the product is recovered by extracting the reaction mixture with ethyl acetate or any other suitable solvents.

The next step of our process is carried out by reacting the 9,11-oxido compound (V) with hydrogen fluoride. This reaction is preferably carried out in the presence of a suitable solvent such as tetrahydrofuran or a mixture of tetrahydrofuran and chloroform. For the obtainment of maximum yields we find that it is desirable to carry out the reaction at a temperature of about 0° C. For example, the reaction is effected by adding a solution of the 9,11-oxido compound in chloroform to a mixture consisting of tetrahydrofuran, chloroform, and hydrogen fluoride at 0° C. After completion of the reaction the reaction mixture is then quenched by the addition of chloroform, ice and potassium carbonate. The chloroform layer is then separated and concentrated down to a dryness whereupon the desired 9α-fluoro-11β-hydroxy-16α-methylprogesterone is obtained.

The 9α-fluoro-11β-hydroxy-16α-methylprogesterone is readily converted to the corresponding 11-keto compound (VII) by reaction with a suitable oxidizing agent. For example, this reaction is conveniently effected by oxidizing the 11β-hydroxy compound with chromium trioxide in the presence of acetic acid. The product can be recovered from the resulting reaction mixture in accordance with conventional procedures known in this art.

In accordance with a further embodiment of this invention, it is found that the halohydrin (III) can be converted to the corresponding 11-keto compound by oxidation of the halohydrin with a suitable oxidizing agent. For example, this is conveniently carried out by intimately contacting the halohydrin with chromium trioxide in glacial acetic acid.

As indicated above, the new compounds of the present invention possess valuable pharmacological properties and are useful as progestational or anti-inflammatory agents. Thus, 9α-fluoro-11β-hydroxy-16α-methylprogesterone possesses oral and subcutaneous progestational activity greater than that of 19-nor ethisterone. The compounds, 9α - fluoro - 11β - hydroxy - 16a - methylprogesterone and 9α-fluoro-11-keto-16α-methylprogesterone are active anti-inflammatory agents and possess systemic granuloma activity of 1 to 3 times that of hydrocortisone. Also, these compounds and 11 - keto - 16α-methyl progesterone show liver glycogen activity. The new compounds of the present invention have the desirable property of being non-salt retainers, whereas the non-methylated compounds are salt retainers. These new compounds, therefore, have important advantages over the products of the prior art.

The following examples illustrate the processes of the present invention.

EXAMPLE 1

*11α-Hydroxy-16α-Methylprogesterone 11α-Mesylate (I)*

Four hundred and twenty milligrams of 11α-hydroxy-16α-methylprogesterone was dissolved in a solution of 6.4 ml. of pyridine and 2.6 ml. of methanesulfonyl chloride at 0° C. The reaction mixture was then warmed to room temperature and allowed to stand for two hours. The reaction mixture was then added to 10 ml. of ice-water and extracted with 3 x 30 ml. of ethyl acetate. The extracts were combined, washed with dilute hydrochloric acid, sodium bicarbonate solution, water, dried and evaporated to dryness resulting in 520 mg. of product. A sample of the 11α-hydroxy-16α-methylprogesterone 11α-mesylate was recrystallized from methylene chloride-ether and melted at 174–176° C. (dec.);

$\lambda_{max.}^{Nujol}$ 5.87μ, 5.98μ, 6.1μ, 7.58μ, 8.58μ

*Analysis.*—Calculated for $C_{23}H_{34}O_5S$ (422.56): S, 7.59. Found: S, 7.48.

EXAMPLE 2

*$\Delta^{9(11)}$-16α-Methylprogesterone (II)*

The 11α-hydroxy-16α-methylprogesterone 11α-mesylate (450 mg.) prepared as described in Example 1 was treated with 610 mg. of sodium acetate and 6 ml. of acetic acid at reflux for thirty minutes. The reaction mixture was then cooled, diluted with water and extracted with 3 x 50 ml. of ether. The extracts were combined, washed with sodium bicarbonate solution, water, dried and evaporated to dryness resulting in 350 mg. of crude product. Recrystallization from petroleum ether (B.P. 30–60° C.) resulted in 290 mg. of crystalline $\Delta^{9(11)}$-16α-methylprogesterone melting at 118–120° C. The product gives a positive color reaction with tetranitromethane.

$\lambda_{max.}^{MeOH}$ 238 (e=17,300), $\lambda_{max.}^{CHCl_3}$ 5.83μ, 5.93μ, 6.15μ

*Analysis.*—Calculated for $C_{22}H_{30}O_2$ (326.46): C, 80.93; H, 9.26. Found: C, 80.87; H, 9.04.

EXAMPLE 3

*9α-Bromo-11β-Hydroxy-16α-Methylprogesterone (III)*

$\Delta^{9,11}$-16α-methylprogesterone (260 mg.) and N-bromosuccinimide (218 mg.) were dissolved in 3 ml. of acetone at 0° C. with stirring. To this stirred solution was added 0.72 ml. of aqueous perchloric acid (0.458 gr. of 70% aqueous perchloric acid in 16.5 ml. of water). The solution remained homogeneous for a few seconds and then a white precipitate of product formed. The reaction mixture was stirred at 0° C. for 2 hours. The product was filtered, washed with cold acetone and ether and air dried. The product weighed 290 mg. and melted 177–184° C. (dec.). A sample of the 9α-bromo-11β-hydroxy-16α-methylprogesterone recrystallized for analysis from hot acetone melted at 185–188° C. (dec.), $\lambda_{max.}^{MeOH}$ 242 (e=15,400), $\lambda_{max.}^{Nujol}$ 2.86μ, 5.88μ, 5.98μ, 6.1μ

*Analysis.*—Calculated for $C_{22}H_{31}O_3Br$ (423.49); C, 62.41; H, 7.38; Br, 18.87. Found: C, 62.61; H, 7.27; Br, 18.97.

EXAMPLE 4

*9β,11β-Oxido-16α-Methylprogesterone (V)*

To a solution of 226 mg. of 9α-bromo-11β-hydroxy-16α-methylprogesterone in 12 ml. of tetrahydrofuran was added 414 mg. of potassium carbonate in 7.2 ml. of water. The reaction mixture was stirred at room temperature for 12 hours, then extracted with ethyl acetate. The extracts were combined, washed with water and dried over sodium sulfate. Removal of the solvent resulted in 190 mg. of crude product. The crude product was chromatographed on acid-washed alumina. The material eluted with ether was recrystallized from petroleum ether (B.P. 30–60° C.) and resulted in 130 mg. of 9β,11β - oxido - 16α - methylprogesterone, M.P. 130–134° C.

$\lambda_{max.}^{MeOH}$ 242 (e=14,400); $\lambda_{max.}^{Nujol}$ 5.80μ, 5.98μ, 6.15μ

*Analysis.*—Calculated for $C_{22}H_{30}O_3$ (342.46): C, 77.15; H, 8.83. Found: C, 76.82; H, 8.60.

EXAMPLE 5

*9α-Fluoro-11β-Hydroxy-16α-Methylprogesterone (VI)*

A solution of 157 mg. of 9β,11β-oxido-16α-methylprogesterone in 5 ml. of chloroform was added to a solution consisting of 2.5 ml. of tetrahydrofuran, 1.8 ml. of chloroform and 3.3 ml. of hydrogen fluoride in tetrahydrofuran (2:1 by weight) at 0° C. The reaction mixture was left at 0° C. for three hours and then left to warm to room temperature and poured into a mixture of 25 gr. of potassium carbonate, 40 grams of ice-water and 40 ml. of chloroform. The chloroform layer was separated and the aqueous layer washed with an additional 20 ml. of chloroform. The chloroform extracts were combined, washed with water, and dried over sodium sulfate. Removal of the solvent resulted in 161 mg. of crude product. Recrystallization from hot acetone resulted in 93 mg. of 9α - fluoro - 11β - hydroxy - 16α - methylprogesterone, M.P. 271–276° C., $\lambda_{max.}^{MeOH}$ 238 (e=16,700): $\lambda_{max.}^{Nujol}$ 2.72μ, 5.80μ, 5.96μ, 6.10μ

*Analysis.*—Calculated for $C_{22}H_{31}O_3F$ (362.47): C, 72.90; H, 8.62; F, 5.25. Found: C, 72.86; H, 8.45; F, 4.88.

EXAMPLE 6

*11-Keto-16α-Methylprogesterone (VIII)*

To a solution of 500 mg. of 11α-hydroxy-16α-methylprogesterone in 8 ml. of glacial acetic acid was added at room temperature a solution containing 150 mg. of chromium trioxide in 7.5 ml. of 90% aqueous acetic acid. The reaction mixture was stirred at room temperature for 30 minutes. At the end of this time, 2 ml. of ethanol was added and the reaction mixture concentrated to a syrup under vacuo. The residue was dissolved in chloroform and the chloroform solution was washed with sodium bicarbonate solution, water and dried over sodium sulfate. Removal of the chloroform and recrystallization of the product from methylene chloride-ether resulted in 290 mg. of 11-keto-16α-methylprogesterone, M.P. 183–186° C., $\lambda_{max.}^{MeOH}$ 238 (e=15,600), $\lambda_{max.}$ 5.80μ, 5.93μ, 6.13μ

*Analysis.*—Calculated for $C_{22}H_{30}O_3$ (342.46): C, 77.15; H, 8.83. Found: C, 77.02; H, 9.00.

EXAMPLE 7

9α-Bromo-11-Keto-16α-Methylprogesterone (IV)

To a solution of 500 mg. of 9α-bromo-11β-hydroxy-16α-methylprogesterone in 8 ml. of glacial acetic acid was added at room temperature a solution containing 150 mg. of chromium trioxide in 7.5 ml. of 90% aqueous acetic acid. The reaction mixture was stirred at room temperature for thirty minutes. Two milliliters of ethanol was added and the reaction mixture concentrated to a syrup under vacuum. The residue was dissolved in chloroform, washed with sodium bicarbonate solution, water and dried over sodium sulfate. Removal of the solvent and recrystallization from methylene chloride-ether resulted in 322 mg. of 9α-bromo-11-keto-16α-methyl-progesteron, M.P. 170–177° C. (dec.), $\lambda_{max.}^{Nujol}$ 5.80μ, 5.95μ, 6.15μ; $\lambda_{max.}^{MeOH}$ 237 ($e=16,100$)

EXAMPLE 8

9α-Fluoro-11-Keto-16α-Methylprogesterone (VII)

To a solution of 9α-fluoro-11β-hydroxy-16α-methylprogesterone (300 mg.) in 4.8 ml. of glacial acetic acid was added a solution of 90 mg. of chromium trioxide in 4.5 ml. of 90% aqueous acetic acid. After a total reaction time of thirty minutes, 2 ml. of ethanol was added and the reaction mixture was concentrated to a syrup under vacuum. The syrup was dissolved in chloroform, washed with sodium bicarbonate solution, water and dried over sodium sulfate. Removal of the solvent and crystallization of 9α-fluoro-11-keto-16α-methylprogesterone from hot acetone resulted in 218 mg., M.P. 185–188° C.;

$\lambda_{max.}^{MeOH}$ 235 ($e=16,300$); $\lambda_{max.}^{Nujol}$ 5.82μ, 5.95μ, 6.15μ

The starting material, 11α-hydroxy-16α-methylprogesterone, used in preparing the new compounds of the present invention can be prepared as follows:

7.2 grams of magnesium was overlaid with 125 ml. of anhydrous ether and converted in the usual way to the Grignard reagent with 45 g. of methyl iodide in 125 ml. anhydrous ether. To this Grignard reagent was added 0.125 g. of cuprous chloride anhydrous and 13.2 g. of Δ16-pregnenolone acetate in 425 ml. of anhydrous ether. The ethereal steroid solution was added over the course of 1 hour and refluxed for 2 hours after addition was complete. The cooled reaction mixture was decomposed by the cautious addition of 300 ml. of saturated ammonium chloride. The aqueous layer was separated and extracted with ether. The combined ethereal extracts were washed to neutrality with water and dried over magnesium sulfate. Evaporation of the ether on the steam bath yielded 8.8 g. of crude 16α-methyl-pregnenolone. The infra-red spectrum of the crude 16α-methyl-pregnenolone indicated complete removal of the acetate group.

One gram of the crude 16α-methylpregnenolone prepared above was dissolved in 140 ml. of acetone distilled from permanganate. The solution was cooled to 0–5° C. and 0.9 ml. of chromic acid solution (26.72 g. of chromic oxide and 23 ml. of sulfuric acid diluted to 100 ml. with water) was added all at once. The mixture was stirred for 5 minutes and poured into 1 liter of water. Then the mixture was placed in a refrigerator for 1 hour, filtered and washed with water. The dried product was dissolved in hot methanol and 2 drops of 2.5 N sodium hydroxide was added and heated on the steam bath for 5 minutes. The alkali was neutralized with 36% acetic acid and diluted with water. The mixture was placed in a refrigerator, filtered and washed with water. The dried product, 16α-methylprogesterone, had a melting point of 116–120° C., U.V.

$\lambda_{max.}^{MeOH}$ 2420, $E_{1\,cm.}^{1\%}$ 417

The 16α-methylprogesterone is converted to 11α-hydroxy-16α-methylprogesterone as follows:

A medium is prepared having the following composition:

| | |
|---|---|
| Glucose | g 20 |
| An enzymatic lactoalbumen digest (Edamin) | g 20 |
| Cornsteep liquor | ml 5 |
| Water to make 1 liter. | |

This medium is distributed in 50 ml. portions in appropriate vessels. The pH of the medium is adjusted to 6.5 with 1 M potassium hydroxide and sterilized at 120° C. for 12 minutes.

The medium in each vessel is then inoculated with a heavy aqueous suspension of spores of a strain of *Rhizopus nigricans* (American Type Culture Collection No. 6227b) and the inoculated media are maintained at an incubation of 28° C. for 48 hours on a rotary shaking machine.

Ten mg. of 16α-methylprogesterone prepared as described is added to each vessel from a dimethyl-formamide solution (100 mg./ml.). The transformation is allowed to go for an additional 24 hours under conditions identical to the growth phase. The whole broth is then extracted 3 times with equal volumes of ethyl acetate, the extracts combined, and finally concentrated. The 11α-hydroxy-16α-methylprogesterone is filtered off.

Various changes and modifications of the invention can be made, and to the extent that such variations incorporate the spirit of this invention, they are intended to be included within the scope of the appended claims.

What is claimed is:

9α-fluoro-11-keto-16α-methylprogesterone.

References Cited in the file of this patent

UNITED STATES PATENTS

| | | |
|---|---|---|
| 2,838,501 | Campbell et al. | June 10, 1958 |
| 2,852,511 | Fried | Sept. 16, 1958 |

OTHER REFERENCES

Marker et al.: J. Am. Chem. Soc., vol. 64 (1942), pages 1280 and 1281.

Jones et al.: J. Am. Chem. Soc., vol. 74 (June 5, 1952), pages 2820–2828.

Taub et al.: J. Am. Chem. Soc., vol. 80 (August 20, 1958), page 4435.

Robinson et al.: J. Am. Chem. Soc., vol. 81 (January 20, 1959), pages 408–410.